(12) United States Patent
Chen et al.

(10) Patent No.: US 7,822,154 B2
(45) Date of Patent: Oct. 26, 2010

(54) SIGNAL, INTERFERENCE AND NOISE POWER MEASUREMENT

(75) Inventors: Ernest C. Chen, San Pedro, CA (US); Chinh Tran, Mountain View, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1409 days.

(21) Appl. No.: 10/236,414

(22) Filed: Sep. 6, 2002

(65) Prior Publication Data

US 2003/0219069 A1 Nov. 27, 2003

Related U.S. Application Data

(63) Continuation-in-part of application No. 09/844,401, filed on Apr. 27, 2001.

(51) Int. Cl.
 *H03D 1/04* (2006.01)
(52) U.S. Cl. .................. 375/346; 375/227; 375/E1.03; 398/26; 455/67.13; 455/135; 455/226.3; 455/277.2; 702/69
(58) Field of Classification Search .............. 375/150, 375/227, 308, 335, 343, 349; 370/252, 352; 380/216, 217; 455/63.1; 710/110, 117, 312
 See application file for complete search history.

(56) References Cited

U.S. PATENT DOCUMENTS

| | | | |
|---|---|---|---|
| 3,076,180 A | 1/1963 | Havens et al. | |
| 3,383,598 A | 5/1968 | Sanders | |
| 3,878,468 A | 4/1975 | Falconer et al. | |
| 3,879,664 A | 4/1975 | Monsen | |
| 3,974,449 A | 8/1976 | Falconer | |
| 4,039,961 A | 8/1977 | Ishio et al. | |
| 4,068,186 A | 1/1978 | Sato et al. | |
| 4,213,095 A | 7/1980 | Falconer | |
| 4,253,184 A | 2/1981 | Gitlin et al. | |
| 4,283,684 A | 8/1981 | Satoh | |

(Continued)

FOREIGN PATENT DOCUMENTS

CA 2442400 11/2002

(Continued)

OTHER PUBLICATIONS

Arslan, Huseyin et al., Iterative Co-Channel Interference Cancellation in Narrowband Mobile Radio Systems, Apr. 10-11, 2000, Emerging Technologies Symposium: Broadband, Wireless Internet Access 2000 IEEE, p. 1-5.*

(Continued)

*Primary Examiner*—David C Payne
*Assistant Examiner*—Adolf Dsouza

(57) ABSTRACT

Systems and methods are presented for measuring power levels of primary and interfering signals as well as noise, particularly for satellite transmitted signals. A typical method comprises the steps of receiving a signal comprising a primary signal, an interference signal and noise, demodulating the primary signal to remove a carrier frequency, decoding the primary signal to obtain symbols, estimating a power level of the primary signal based upon the demodulated and decoded primary signal. Additionally, an ideal primary signal can be generated from the carrier power and frequency and the symbols and subtracted from the received signal to produce the noise and interference signal. The noise and interference power is then estimated from the noise and interference signal.

26 Claims, 8 Drawing Sheets

U.S. PATENT DOCUMENTS

| | | | |
|---|---|---|---|
| 4,384,355 A | 5/1983 | Werner | |
| RE31,351 E | 8/1983 | Falconer | |
| 4,416,015 A | 11/1983 | Gitlin | |
| 4,422,175 A | 12/1983 | Bingham et al. | |
| 4,484,337 A | 11/1984 | Leclert et al. | |
| 4,500,984 A | 2/1985 | Shimbo et al. | |
| 4,519,084 A | 5/1985 | Langseth | |
| 4,594,725 A | 6/1986 | Desperben et al. | |
| 4,628,507 A | 12/1986 | Otani | |
| 4,637,017 A | 1/1987 | Assal et al. | |
| 4,647,873 A | 3/1987 | Beckner et al. | |
| 4,654,863 A | 3/1987 | Belfield et al. | |
| 4,670,789 A | 6/1987 | Plume | |
| 4,709,374 A | 11/1987 | Farrow | |
| 4,800,573 A | 1/1989 | Cupo | |
| 4,829,543 A | 5/1989 | Borth et al. | |
| 4,835,790 A | 5/1989 | Yoshida et al. | |
| 4,847,864 A | 7/1989 | Cupo | |
| 4,860,315 A | 8/1989 | Hosoda et al. | |
| 4,878,030 A | 10/1989 | Vincze | |
| 4,896,369 A | 1/1990 | Adams et al. | |
| 4,918,708 A | 4/1990 | Pottinger et al. | |
| 4,992,747 A | 2/1991 | Myers | |
| 4,993,047 A | 2/1991 | Moffatt et al. | |
| 5,043,734 A | 8/1991 | Niho | |
| 5,088,110 A | 2/1992 | Bonnerot et al. | |
| 5,111,155 A | 5/1992 | Keate et al. | |
| 5,121,414 A | 6/1992 | Levine et al. | |
| 5,199,047 A | 3/1993 | Koch | |
| 5,206,886 A | 4/1993 | Bingham | |
| 5,206,889 A | 4/1993 | Unkrich | |
| 5,221,908 A | 6/1993 | Katz et al. | |
| 5,229,765 A | 7/1993 | Gardner | |
| 5,233,632 A | 8/1993 | Baum et al. | |
| 5,237,292 A | 8/1993 | Chethik | |
| 5,285,474 A | 2/1994 | Chow et al. | |
| 5,285,480 A | 2/1994 | Chennakeshu et al. | |
| 5,317,599 A | 5/1994 | Obata | |
| 5,329,311 A | 7/1994 | Ward et al. | |
| 5,337,014 A | 8/1994 | Najle et al. | |
| 5,353,307 A | 10/1994 | Lester et al. | |
| 5,412,325 A | 5/1995 | Meyers | |
| 5,430,770 A | 7/1995 | Abbey | |
| 5,450,623 A | 9/1995 | Yokoyama et al. | |
| 5,467,197 A | 11/1995 | Hoff | |
| 5,471,508 A | 11/1995 | Koslov | |
| 5,493,307 A | 2/1996 | Tsujimoto | |
| 5,513,215 A | 4/1996 | Marchetto et al. | |
| 5,555,257 A | 9/1996 | Dent | |
| 5,577,067 A | 11/1996 | Zimmerman | |
| 5,577,087 A | 11/1996 | Furuya | |
| 5,579,344 A | 11/1996 | Namekata | |
| 5,581,229 A | 12/1996 | Hunt | |
| 5,602,868 A | 2/1997 | Wilson | |
| 5,606,286 A | 2/1997 | Bains | |
| 5,608,331 A | 3/1997 | Newberg et al. | |
| 5,625,640 A | 4/1997 | Palmer et al. | |
| 5,642,358 A | 6/1997 | Dent | |
| 5,648,955 A * | 7/1997 | Jensen et al. | 370/252 |
| 5,671,253 A | 9/1997 | Stewart | |
| 5,732,113 A | 3/1998 | Schmidl et al. | |
| 5,793,818 A | 8/1998 | Claydon et al. | |
| 5,799,010 A | 8/1998 | Lomp et al. | |
| 5,815,531 A | 9/1998 | Dent | |
| 5,819,157 A | 10/1998 | Ben-Efraim et al. | |
| 5,828,710 A | 10/1998 | Beale | |
| 5,848,060 A | 12/1998 | Dent | |
| 5,870,439 A | 2/1999 | Ben-Efraim et al. | |
| 5,870,443 A | 2/1999 | Rahnema | |
| 5,903,546 A | 5/1999 | Ikeda et al. | |
| 5,909,454 A | 6/1999 | Schmidt | |
| 5,937,004 A | 8/1999 | Fasulo et al. | |
| 5,940,025 A | 8/1999 | Koehnke et al. | |
| 5,940,750 A | 8/1999 | Wang | |
| 5,952,834 A | 9/1999 | Buckley | |
| 5,956,373 A | 9/1999 | Goldston et al. | |
| 5,960,040 A | 9/1999 | Cai et al. | |
| 5,963,845 A | 10/1999 | Floury et al. | |
| 5,966,048 A | 10/1999 | Thompson | |
| 5,966,186 A | 10/1999 | Shigihara et al. | |
| 5,966,412 A | 10/1999 | Ramaswamy | |
| 5,970,098 A | 10/1999 | Herzberg | |
| 5,970,156 A | 10/1999 | Hummelgaard et al. | |
| 5,970,429 A | 10/1999 | Martin | |
| 5,978,652 A | 11/1999 | Burr et al. | |
| 5,987,068 A | 11/1999 | Cassia et al. | |
| 5,995,832 A | 11/1999 | Mallinckrodt | |
| 5,999,793 A | 12/1999 | Ben-Efraim et al. | |
| 6,002,713 A | 12/1999 | Goldstein et al. | |
| 6,008,692 A | 12/1999 | Escartin | |
| 6,018,556 A | 1/2000 | Janesch et al. | |
| 6,021,159 A | 2/2000 | Nakagawa | |
| 6,028,894 A | 2/2000 | Oishi et al. | |
| 6,032,026 A * | 2/2000 | Seki et al. | 455/63.1 |
| 6,034,952 A | 3/2000 | Dohi et al. | |
| 6,049,566 A | 4/2000 | Saunders et al. | |
| 6,052,586 A | 4/2000 | Karabinis | |
| 6,055,278 A | 4/2000 | Ho et al. | |
| 6,061,393 A | 5/2000 | Tsui et al. | |
| 6,072,841 A | 6/2000 | Rahnema | |
| 6,075,808 A | 6/2000 | Tsujimoto | |
| 6,078,645 A | 6/2000 | Cai et al. | |
| 6,084,919 A | 7/2000 | Kleider et al. | |
| 6,104,747 A | 8/2000 | Jalloul et al. | |
| 6,108,374 A | 8/2000 | Balachandran et al. | |
| 6,125,148 A | 9/2000 | Frodigh et al. | |
| 6,125,260 A | 9/2000 | Wiedeman et al. | |
| 6,128,357 A | 10/2000 | Lu et al. | |
| 6,131,013 A | 10/2000 | Bergstrom et al. | |
| 6,134,282 A | 10/2000 | Ben-Efraim et al. | |
| 6,140,809 A | 10/2000 | Doi | |
| 6,141,534 A | 10/2000 | Snell et al. | |
| 6,144,708 A | 11/2000 | Maruyama | |
| 6,166,601 A | 12/2000 | Shalom et al. | |
| 6,177,836 B1 | 1/2001 | Young et al. | |
| 6,178,158 B1 | 1/2001 | Suzuki et al. | |
| 6,188,717 B1 | 2/2001 | Kaiser et al. | |
| 6,192,088 B1 | 2/2001 | Aman et al. | |
| 6,212,360 B1 | 4/2001 | Fleming et al. | |
| 6,219,095 B1 | 4/2001 | Zhang et al. | |
| 6,246,717 B1 | 6/2001 | Chen et al. | |
| 6,249,180 B1 | 6/2001 | Maalej et al. | |
| 6,266,534 B1 | 7/2001 | Raith et al. | |
| 6,272,679 B1 | 8/2001 | Norin | |
| 6,275,678 B1 | 8/2001 | Bethscheider et al. | |
| 6,297,691 B1 | 10/2001 | Anderson et al. | |
| 6,304,594 B1 | 10/2001 | Salinger | |
| 6,307,435 B1 | 10/2001 | Nguyen et al. | |
| 6,313,885 B1 | 11/2001 | Patel et al. | |
| 6,314,441 B1 | 11/2001 | Raghunath | |
| 6,320,464 B1 | 11/2001 | Suzuki et al. | |
| 6,320,919 B1 | 11/2001 | Khyrallah et al. | |
| 6,325,332 B1 | 12/2001 | Cellier et al. | |
| 6,330,336 B1 | 12/2001 | Kasama | |
| 6,333,924 B1 | 12/2001 | Porcelli et al. | |
| 6,335,951 B1 | 1/2002 | Cangiani et al. | |
| 6,366,309 B1 | 4/2002 | Siegle | |
| 6,369,648 B1 | 4/2002 | Kirkman | |
| 6,377,116 B1 | 4/2002 | Mattsson et al. | |
| 6,389,002 B1 | 5/2002 | Schilling | |
| 6,404,819 B1 | 6/2002 | Gehlot | |
| 6,411,659 B1 | 6/2002 | Liu et al. | |
| 6,411,797 B1 | 6/2002 | Estinto | |
| 6,426,822 B1 | 7/2002 | Winter et al. | |

| | | | |
|---|---|---|---|
| 6,429,740 B1 | 8/2002 | Nguyen et al. | |
| 6,433,835 B1 | 8/2002 | Hartson et al. | |
| 6,452,977 B1 | 9/2002 | Goldston et al. | |
| 6,477,398 B1 | 11/2002 | Mills | |
| 6,501,804 B1 | 12/2002 | Dietmar et al. | |
| 6,515,713 B1 | 2/2003 | Nam | |
| 6,522,683 B1 | 2/2003 | Smee et al. | |
| 6,529,715 B1 | 3/2003 | Kitko et al. | |
| 6,535,497 B1 | 3/2003 | Raith | |
| 6,535,801 B1 | 3/2003 | Geier et al. | |
| 6,539,050 B1 | 3/2003 | Lee et al. | |
| 6,556,639 B1 | 4/2003 | Goldston et al. | |
| 6,574,235 B1 | 6/2003 | Arslan et al. | |
| 6,597,750 B1 | 7/2003 | Knutson et al. | |
| 6,657,978 B1 | 12/2003 | Millman | |
| 6,661,761 B2 | 12/2003 | Hayami et al. | |
| 6,678,336 B1 | 1/2004 | Katoh et al. | |
| 6,700,442 B2 | 3/2004 | Ha | |
| 6,718,184 B1 | 4/2004 | Aiken et al. | |
| 6,731,698 B1 | 5/2004 | Yoshie | |
| 6,731,700 B1 | 5/2004 | Yakhnich et al. | |
| 6,741,662 B1 | 5/2004 | Francos et al. | |
| 6,745,050 B1 | 6/2004 | Forsythe et al. | |
| 6,772,182 B1 | 8/2004 | McDonald et al. | |
| 6,775,521 B1 | 8/2004 | Chen | |
| 6,795,496 B1 | 9/2004 | Soma et al. | |
| 6,803,814 B1 | 10/2004 | Krupezevic et al. | |
| 6,809,587 B2 | 10/2004 | Ghannouchi et al. | |
| 6,892,068 B2 | 5/2005 | Karabinis et al. | |
| 6,922,436 B1 | 7/2005 | Porat et al. | |
| 6,922,439 B2 | 7/2005 | Yamaguchi et al. | |
| 6,934,314 B2 | 8/2005 | Harles et al. | |
| 6,947,741 B2 | 9/2005 | Beech et al. | |
| 6,956,841 B1 | 10/2005 | Stahle et al. | |
| 6,956,924 B2 | 10/2005 | Linsky et al. | |
| 6,970,496 B1 | 11/2005 | Ben-Bassat et al. | |
| 6,980,609 B1 | 12/2005 | Ahn | |
| 6,990,627 B2 | 1/2006 | Uesugi et al. | |
| 6,999,510 B2 | 2/2006 | Batruni | |
| 7,041,406 B2 | 5/2006 | Schuler et al. | |
| 7,073,116 B1 | 7/2006 | Settle et al. | |
| 7,079,585 B1 | 7/2006 | Settle et al. | |
| 7,154,958 B2 | 12/2006 | Dabak et al. | |
| 7,161,931 B1 | 1/2007 | Li et al. | |
| 7,173,981 B1 | 2/2007 | Chen et al. | |
| 7,209,524 B2 | 4/2007 | Chen | |
| 7,230,992 B2 | 6/2007 | Walker et al. | |
| 7,239,876 B2 | 7/2007 | Johnson et al. | |
| 7,263,119 B1 | 8/2007 | Hsu et al. | |
| 2001/0012322 A1 | 8/2001 | Nagaoka et al. | |
| 2001/0024479 A1 | 9/2001 | Samarasooriya | |
| 2001/0055295 A1 | 12/2001 | Akiyama et al. | |
| 2002/0006795 A1 | 1/2002 | Norin et al. | |
| 2002/0009141 A1 | 1/2002 | Yamaguchi et al. | |
| 2002/0010001 A1 | 1/2002 | Dahlman et al. | |
| 2002/0051435 A1 | 5/2002 | Giallorenzi et al. | |
| 2002/0067744 A1 | 6/2002 | Fujii et al. | |
| 2002/0071506 A1 | 6/2002 | Lindquist et al. | |
| 2002/0082792 A1 | 6/2002 | Bourde et al. | |
| 2002/0136327 A1 | 9/2002 | El-Gamal et al. | |
| 2002/0158619 A1 | 10/2002 | Chen | |
| 2002/0172296 A1 | 11/2002 | Pilcher | |
| 2002/0176516 A1 | 11/2002 | Jeske et al. | |
| 2002/0186761 A1 | 12/2002 | Corbaton et al. | |
| 2003/0002471 A1 | 1/2003 | Crawford et al. | |
| 2003/0043941 A1 | 3/2003 | Johnson et al. | |
| 2003/0072385 A1 | 4/2003 | Dragonetti | |
| 2003/0138037 A1 | 7/2003 | Kaku et al. | |
| 2003/0147472 A1 | 8/2003 | Bach et al. | |
| 2003/0171102 A1 | 9/2003 | Yang | |
| 2003/0185310 A1 | 10/2003 | Ketchum et al. | |
| 2003/0194022 A1 | 10/2003 | Hammons et al. | |
| 2004/0013084 A1 | 1/2004 | Thomas et al. | |
| 2004/0091059 A1 | 5/2004 | Chen | |
| 2004/0110467 A1 | 6/2004 | Wang | |
| 2004/0146014 A1 | 7/2004 | Hammons et al. | |
| 2004/0146296 A1 | 7/2004 | Gerszberg et al. | |
| 2004/1013786 | 7/2004 | Walton et al. | |
| 2004/0196935 A1 | 10/2004 | Nieto | |
| 2005/0008100 A1 | 1/2005 | Chen | |
| 2005/0037724 A1 | 2/2005 | Walley et al. | |
| 2006/0013333 A1 | 1/2006 | Chen | |
| 2006/0022747 A1 | 2/2006 | Chen et al. | |
| 2006/0045191 A1 | 3/2006 | Vasanth et al. | |
| 2006/0056541 A1 | 3/2006 | Chen et al. | |
| 2007/1001171 | 1/2007 | Koslov et al. | |
| 2007/0121718 A1 | 5/2007 | Wang et al. | |

FOREIGN PATENT DOCUMENTS

| | | |
|---|---|---|
| CA | 2502924 | 5/2004 |
| DE | 3642213 | 12/1986 |
| EP | 0115218 | 8/1984 |
| EP | 0222076 | 8/1986 |
| EP | 0 238 822 A2 | 9/1987 |
| EP | 0 356 096 A2 | 2/1990 |
| EP | 0356096 A2 | 2/1990 |
| EP | 0929164 | 7/1999 |
| EP | 1011245 | 6/2000 |
| EP | 1054537 A1 | 11/2000 |
| EP | 1065854 | 1/2001 |
| EP | 1081903 A1 | 3/2001 |
| EP | 1335512 | 8/2003 |
| FR | 2696295 | 4/1994 |
| FR | 2724522 | 3/1996 |
| JP | 2-5631 | 1/1990 |
| JP | 2-95033 | 4/1990 |
| JP | 03139027 | 6/1991 |
| JP | 5-41683 | 2/1993 |
| JP | 5-114878 | 5/1993 |
| JP | 5-252084 | 9/1993 |
| JP | 07-038615 | 2/1995 |
| JP | 2002118611 | 4/2002 |
| KR | 2001 0019997 | 3/2001 |
| TW | 318983 B | 11/1997 |
| TW | 362333 B | 6/1999 |
| TW | 391107 B | 5/2000 |
| TW | 435009 B | 5/2001 |
| TW | 451569 B | 8/2001 |
| TW | 462168 B | 11/2001 |
| TW | 499800 B | 8/2002 |
| TW | 502506 B | 9/2002 |
| WO | WO 99/00957 | 1/1999 |
| WO | WO 99/20001 | 4/1999 |
| WO | WO 99/23718 | 5/1999 |
| WO | WO 00/79708 A1 | 12/2000 |
| WO | WO 01/19013 | 3/2001 |
| WO | WO 01/39455 | 5/2001 |
| WO | WO 01/39456 | 5/2001 |
| WO | WO 02/073817 | 9/2002 |
| WO | WO 2005/074171 | 8/2005 |
| WO | WO 2005/086444 | 9/2005 |

OTHER PUBLICATIONS

Gianluca Mazzini, *Power Division Multiple Access*, IEEE, 1998, pp. 543-546.
Ivan Seskar, et al., *Implementation Aspects for Successive Interface Cancellation in DS/CDMA Systems*, Wireless Networks, 1998, pp. 447-452.
Janssen G J M; Slimane S B: "Performance of a Multiuser Detector for M-PSK Signals Based on Successive Cancellation", ICC 2001, 2001 IEEE International Conference on Communications, Conference Record, Helsinky, Finland, Jun. 11-14, 2001, XP010552960.
Slimane S B; Janssen G J M: "Power Optimization of M-PSK Cochannel Signals for a Narrowband Multiuser Detector", 2001

IEEE Pacific Rim Conference on Communications, Computer and Signal Processing, Victoria BC, Canada, Aug. 26-28, 2001, XP010560334.

Soong, A C K; Krzymien W A: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17, 1995, XP010159490.

Arslan H; Molnar K: "Iterative Co-channel Interference Cancellation in Narrowband Mobile Radio Systems", Emerging Technologies Symposium: Broadband, Wireless Internet Access, 2000 IEEE Apr. 10-11, 2000, Piscataway, New Jersey, USA, XP010538900.

Ramchandran, Kannan et al., *Multiresolution Broadcast for Digital HDTV Using Joint Source/Channel Coding*, IEEE, vol. 11, No. 1, Jan. 1993, pp. 6-22.

Meyr, Heinrich et al.; "Digital Communication Receivers: Synchronization, Channel Estimation, and Signal Processing"; 1998, John Wiley & Sons, Inc.; pp. 212-213 and 217-218; XP002364874.

Meyr, Heinrich et al.; "Digital Communication Receivers: Synchronization, Channel Estimation, and Signal Processing"; 1998, John Wiley & Sons, Inc.; pp. 610-612; XP002364876.

Saleh, A.A.M. et al.: "Adaptive Linearization of Power Amplifiers in Digital Radio Systems", Bell System Technical Journal, American Telephone and Telegraph Co., New York, US, vol. 62, No. 4, Part 1, Apr. 1, 1983, pp. 1019-1033, XP002028354.

Fant, T. et al.; "Fourth-Power Law Clock Recovery with Prefiltering"; Proceedings of the International Conference on Communications (ICC); Geneva; May 23-26, 1993; New York; IEEE; US; vol. 3; May 23, 1993; pp. 811-815 XP010137089, ISBN: 0-7803-0950-2; Section I, Introduction.

The Authoritive Dictionary of IEEE Standards Terms; Seventh Edition, pp. 1047—definition of "signal".

Chen, Ernest et al.; "DVB-S2 Backward-Compatible Modes: A Bridge Between the Present and the Future"; International Journal of Satellite Communications and Networking; vol. 22, Issue 3, pp. 341-365; published 2004 by John Wiley & Sons, Ltd.

Wolcott, Ted J. et al.; "Uplink-Noise Limited Satellite Channels"; IEEE 1995; pp. 717-721; XP-00580915.

Seskar, Ivan et al.; "Implementation Aspects for Successive Interface Cancellation in DS/CDMA Systems"; Wireless Networks; 1998; pp. 447-452.

Earth Station Technology; 1986; pp. 404-412; XP-002248387.

Palicot, J., Veillard, J.; "Possible Coding and Modulation Approaches to Improve Service Availability for Digital HDTV Satellite Broadcasting at 22 GHz"; IEEE Transactions on Consumer Electronics; vol. 39, Issue 3; Aug. 1993; pp. 660-667.

U.S. Appl. No. 10/693,135, filed Oct. 24, 2003, Chen.

U.S. Appl. No. 10/532,632, filed Apr. 25, 2003, Chen et al.

ROC (Taiwan) Search Report dated Apr. 3, 2009 in ROC (Taiwan) Patent Application No. 092129498 filed Oct. 24, 2003 by Ernest C. Chen et al., received by Applicants on Aug. 11, 2009.

ROC (Taiwan) Search Report dated Apr. 3, 2009 in ROC (Taiwan) Patent Application No. 092117948 filed Jul. 1, 2003 by Ernest C. Chen et al., received by Applicants on Aug. 11, 2009.

Notice of Allowance dated Sep. 15, 2009 in U.S. Appl. No. 10/519,375, filed Dec. 22, 2004 by Ernest C. Chen et al.

Notice of Allowance dated Sep. 4, 2009 in U.S. Appl. No. 12/329,456, filed Dec. 5, 2008 by Ernest C. Chen et al.

Notice of Allowance dated Jul. 13, 2009 in U.S. Appl. No. 10/913,927, filed Aug. 5, 2004 by Ernest C. Chen.

Canadian Office Action dated Sep. 17, 2009 in Canadian Patent Application No. 2503432 filed Oct. 20, 2003 by Paul R. Anderson et al.

EPO Summons to attend oral proceedings dated Sep. 16, 2009 in European Patent Application No. 03757359.9 filed Jun. 5, 2003 by Ernest C. Chen.

Notice of Allowance dated Sep. 6, 2007 in U.S. Appl. No. 10/692,491 filed Oct. 24, 2003 by Ernest C. Chen.

Notice of Allowance dated Mar. 25, 2008 in U.S. Appl. No. 11/653,517 filed Jan. 16, 2007 and issued Jan. 27, 2009 as US Patent No. 7,483,495 by Ernest C. Chen.

Non-final Office action dated Sep. 28, 2007 in U.S. Appl. No. 10/961,579 filed Oct. 08, 2004 by Ernest C. Chen.

Non-final Office action dated Oct. 16, 2007 in U.S. Appl. No. 10/962,346 filed Oct. 08, 2004 by Ernest C. Chen.

Supplementary European Search Report dated Sep. 7, 2007 in European Patent Application No. 03742400.9 filed Jul. 1, 2003 by Ernest C. Chen et al.

Non-final Office action dated Dec. 27, 2007 in U.S. Appl. No. 10/519,375 filed Dec. 22, 2004 by Ernest C. Chen et al.

Non-final Office action dated Dec. 11, 2007 in U.S. Appl. No. 10/913,927 filed Aug. 5, 2004 by Ernest C. Chen.

Non-final Office action dated Nov. 16, 2007 in U.S. Appl. No. 10/691,032 filed Oct. 22, 2003 by Weizheng Wang et al.

Notice of Allowance dated Dec. 11, 2007 in U.S. Appl. No. 10/519,322 filed Dec. 23, 2004 and issued Aug. 26, 2008 as US Patent No. 7,418,060 by Ernest C. Chen et al.

Notice of Allowance dated Dec. 26, 2007 in U.S. Appl. No. 10/532,619 filed Apr. 25, 2005 and issued Dec. 30, 2008 as US Patent No. 7,471,735 by Ernest C. Chen.

Notice of Allowance dated Sep. 20, 2007 in U.S. Appl. No. 10/692,539 filed Oct. 24, 2003 and issued Dec. 9, 2008 as US Patent No. 7,463,676 by Ernest C. Chen.

EPO Communication dated Mar. 11, 2008 in European Application No. 03777694.5 filed Oct. 17, 2003 by Ernest Chen et al.

EPO Communication dated Mar. 7, 2008 in European Application No. 03742393.6 filed Jul. 3, 2003 by Ernest Chen et al.

Canadian Office action dated Sep. 12, 2007 in Canadian Application No. 2491259 filed Jul. 3, 2003 by Ernest C. Chen et al.

Norwegian Office action dated Nov. 15, 2007 in Norwegian Application No. 20026115 filed Apr. 24, 2002 by Ernest C. Chen.

EPO Communication dated Aug. 3, 2007 in European Application No. 03794510.2 filed Aug. 26, 2003 by Ernest C. Chen et al.

Arslan, Huseyin and Molnar, Karl; "Co-channel Interference Cancellation with Successive Cancellation in Narrowband TDMA Systems"; Wireless Communications and Networking Conference; 2000 IEEE; Sep. 23-28, 2000; Piscataway, New Jersey, USA; vol. 3; pp. 1070-1074; XP010532692; ISBN: 0-7803-6596-8.

Non-final Office action dated Mar. 3, 2008 in U.S. Appl. No. 11/656,662 filed Jan. 22, 2007 by Ernest C. Chen et al.

Non-final Office action dated Apr. 1, 2008 in U.S. Appl. No. 10/961,579 filed Oct. 8, 2004 by Ernest C. Chen.

Notice of Allowance dated May 6, 2008 in U.S. Appl. No. 10/532,631 filed Apr. 25, 2005 and issued Sep. 9, 2008 as US Patent No. 7,423,987 by Paul R. Anderson et al.

Non-final Office action dated Apr. 30, 2008 in U.S. Appl. No. 10/962,346 filed Oct. 8, 2004 by Ernest Chen.

Notice of Allowance dated Apr. 30, 2008 in U.S. Appl. No. 11/603,776 filed Nov. 22, 2006 and issued Sep. 16, 2008 as US Patent No. 7,426,246 by Ernest Chen et al.

EPO Communication dated Apr. 4, 2008 in European counterpart Application No. 03757359.9 corresponding to U.S. Appl. No. 10/165,710 filed Jun. 7, 2002 by Ernest Chen.

Notice of Allowance dated Mar. 12, 2008 in U.S. Appl. No. 11/655,001 filed Jan. 18, 2007 and issued Dec. 23, 2008 as US Patent No. 7,469,019 by Weizheng Wang et al.

Japanese Office Action dated Mar. 4, 2008 in Japanese counterpart Application No. 2004297297 corresponding to U.S. Appl. No. 10/962,346 filed Oct. 8, 2004 by Ernest Chen.

EPO Communication dated Feb. 26, 2008 in European counterpart Application No. 04256234.8 corresponding to U.S. Appl. No. 10/962,346 filed Oct. 8, 2004 by Ernest Chen.

EPO Communication dated Feb. 7, 2008 in European counterpart Application No. 03742400.9 and received from European representative on Feb. 14, 2008 and corresponding to U.S. Appl. No. 10/519,322 filed Dec. 23, 2004 by Ernest Chen et al.

Notice of Allowance dated May 8, 2008 in U.S. Appl. No. 11/619,173 filed Jan. 2, 2007 and issued Sep. 16, 2008 as US Patent No. 7,426,243 by Ernest Chen et al.

Notice of Allowance dated May 6, 2008 in U.S. Appl. No. 10/532,632 filed Apr. 25, 2005 and issued Mar. 31, 2009 as US Patent No. 7,512,189 by Ernest Chen et al.

Scott, R. P. et al.; Ultralow Phase Noise Ti:sapphire Laser Rivals 100 MHz Crystal Oscillator; Nov. 11-15, 2001; IEEE-Leos; pp. 1-2.

Combarel, L. et al.; HD-SAT Modems for the Satellite Broadcasting in the 20 GHz Frequency Band; IEEE Transactions on Consumer Electronics; vol. 41, Issue 4; Nov. 1995; pp. 991-999.

EPO Summons to oral proceedings dated Feb. 10, 2010 in European Patent Application No. 03742400.9 filed Jul. 1, 2003 by Ernest C. Chen et al.

EPO Communication dated Feb. 22, 2010 in European Patent Application No. 03777627.5 filed Oct. 16, 2003 by Ernest C. Chen.

Notice of Allowance dated Apr. 2, 2010 in U.S. Appl. No. 10/165,710 filed Jun. 7, 2002 by Ernest C. Chen.

* cited by examiner

SIGNAL, INTERFERENCE AND NOISE POWER MEASUREMENT

CROSS-REFERENCE TO RELATED APPLICATIONS

This is a continuation-in-part application and claims the benefit under 35 U.S.C. Section 120 of the following co-pending and commonly-assigned U.S. utility patent application, which is incorporated by reference herein:

Utility application Ser. No. 09/844,401, filed Apr. 27, 2001, by Ernest C. Chen, entitled "LAYERED MODULATION FOR DIGITAL SIGNALS,".

BACKGROUND OF THE INVENTION

1. Field of the Invention

The present invention relates generally to systems and methods for monitoring signal qualities of a transmitted signal based on measuring the received signal, and particularly for measuring carrier, interference and noise power in a satellite signal.

2. Description of the Related Art

In systems employing transmitted signals it is often necessary to estimate the signal quality to obtain an indication of the system performance. There is also a need to monitor frequency reuse across a multiple coverage areas. For example, satellite systems employing spotbeams with substantially similar transmission frequencies over adjacent coverage areas may interfere at their boundaries. It is important to be able to accurately identify the signal quality at these boundaries to optimize the overall signal patterns. Carrier, interference and noise power levels are examples of important signal qualities that may be measured. Carrier power indicates the strength of the signal and hence, where it may be received by a receiver. Noise and interference, however, may distort a received signal and prevent its use even if the carrier power is otherwise sufficient. Thus, the carrier to noise ratio (CNR) and the carrier to interference ratio (CIR) are two significant measures of signal quality. The interference to noise ratio (INR) is another property of interest, which may be derived from CNR and CIR.

The CIR of a transmitted signal has been estimated by analyzing a link budget with propagation and geometric parameters, such as the relative transmitter power, position and range, and antenna look angle and pattern. Several methods have been used this way to estimate the CNR, ranging in accuracy and complexity. Systems and methods which accurately measure signal qualities (including CIR and CNR) employing a systematic and unified methodology would be very useful. Such systems and methods may be used to optimize the power control for any given transmitted signal.

In addition, systems which may employ overlapping beams with substantially similar transmission frequencies are improved with signal quality feedback to optimize their operation. Communication systems which employ layered modulation, such as described in co-pending and commonly assigned application Ser. No. 09/844,401, filed Apr. 27, 2001, by Ernest Chen and entitled "LAYERED MODULATION FOR DIGITAL SIGNALS", which is hereby incorporated by reference herein, are examples of such systems.

SUMMARY OF THE INVENTION

Systems and methods of measuring signal properties based on successive demodulating and decoding, such as satellite signal power properties, are presented. One embodiment of the invention comprises the steps of receiving a signal comprising a primary signal, noise and an interfering signal, the primary signal including a carrier frequency and symbols, demodulating and decoding the primary signal to obtain the carrier frequency, the symbols and a DC level of the primary signal, calculating the primary signal power from the DC power level of the primary signal, generating an ideal primary signal from the carrier frequency and the symbols and subtracting the ideal primary signal from the received signal to produce the noise and interfering signal, demodulating and decoding the interfering signal to obtain the carrier frequency, the symbols and a DC level of the interfering signal, calculating the interfering signal power from the DC power level of the interfering signal, and subtracting the interfering signal from the noise and interfering signal power to obtain the noise power.

The invention calculates the relative powers among the carrier, interference, and noise from a received signal. By coherently processing the received signal from any receiver location of interest, this method sequentially analyzes the carrier and interference waveforms and forms estimates of the carrier, interference and noise powers. When a calibration technique is used the absolute powers may also be derived as desired.

The invention is particularly useful in satellite systems employing spotbeam frequency reuse. In such systems, the spotbeam satellites must transmit a sufficient carrier power for adequate CNR over the entire coverage area of a given region, while not transmitting so much power as to cause an undue interference to an adjacent beam that operates at substantially the same frequency (a co-channel interference (CCI) phenomenon). The systems and methods disclosed herein can provide CNR and CIR measurements at any receiver location of interest providing, for example, a measurement of the current clear-sky margin. The information may be used by satellite telemetry, tracking and command (TT&C) to adjust transponder powers for optimal system performance. In addition, the information may be used to monitor the operation and general health of selected satellite transponders.

This invention provides a systematic and unified approach to separate the carrier, interference and noise from a received signal for separate power measurements. The result is a consistent and highly accurate estimate of key measurements of signal quality.

It should be noted that the signal subtraction to reveal the interference and noise signal may be performed before or after demodulation of the received signal. There may be a processing advantage in performing the subtraction on the received signal after demodulation. In each case, however, the ideal signal must be generated appropriate to the signal from which it will be subtracted, i.e. in a received or demodulated form.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Figure 1A:
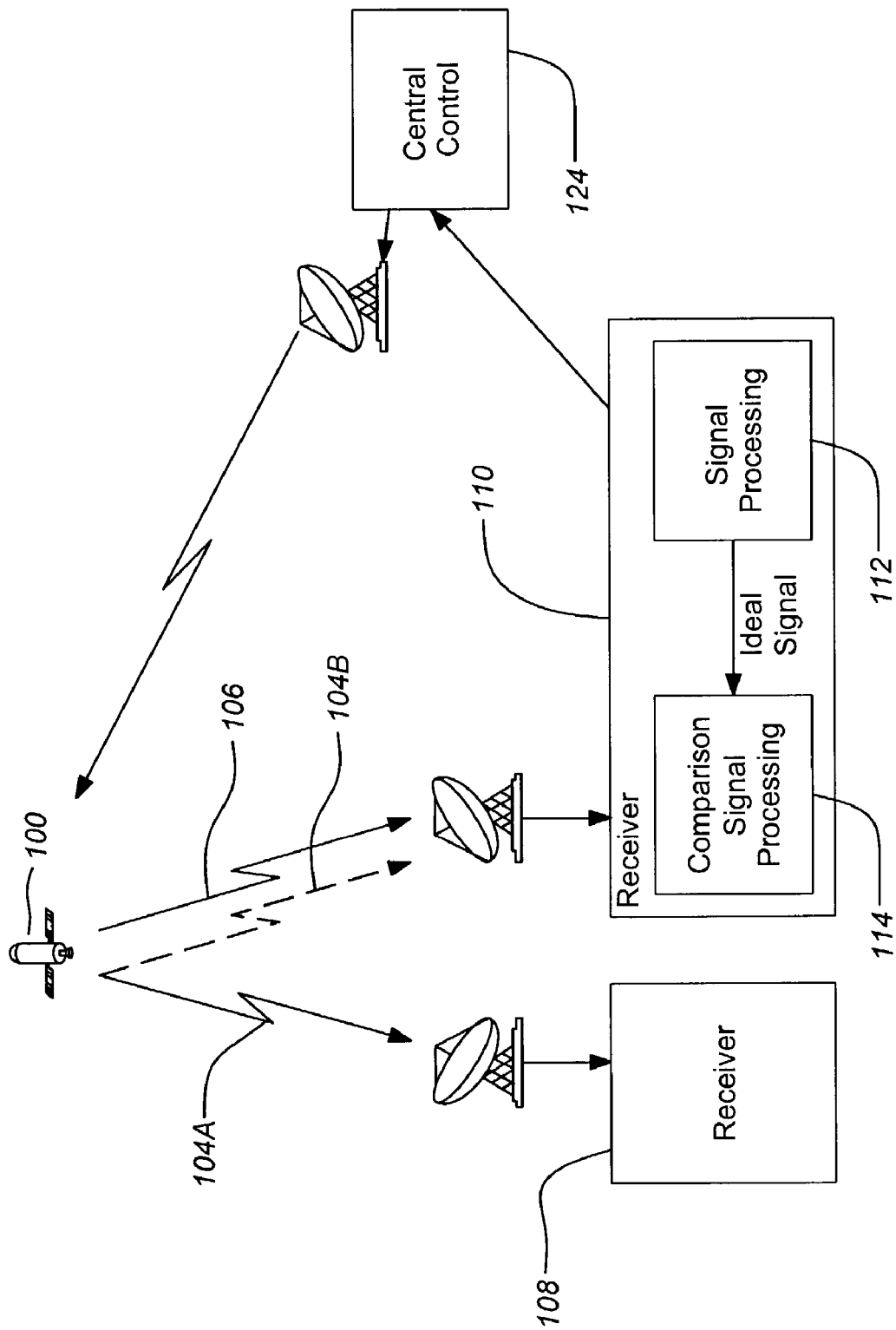
FIGS. 1A-1B illustrate a typical satellite transmission system and interference scenario.
Figure 1B:
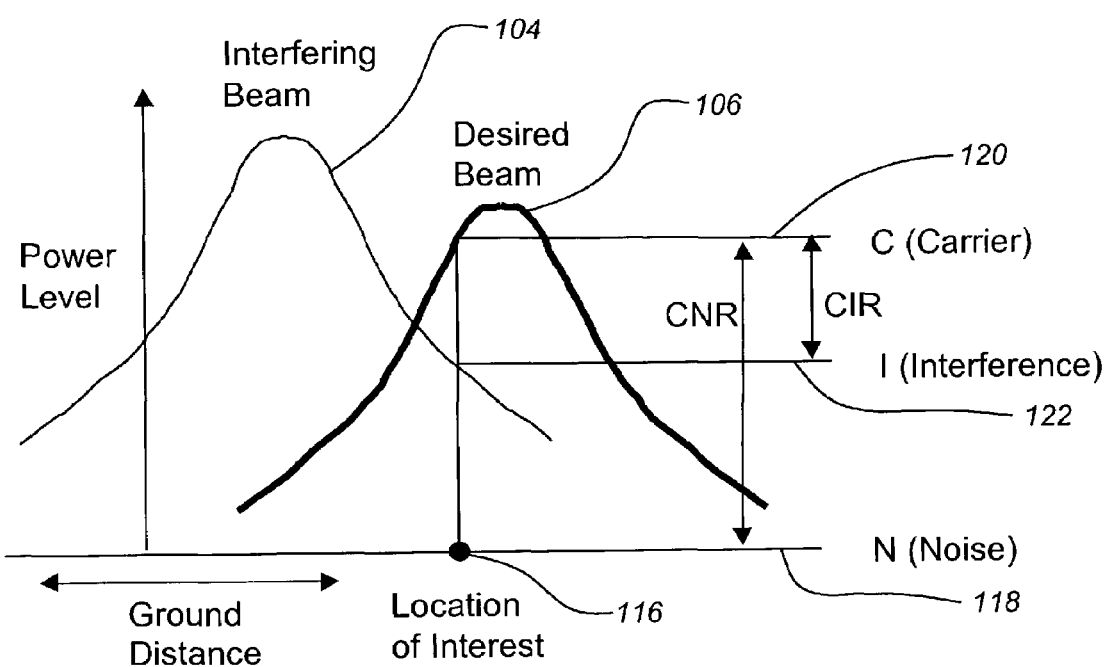

FIGS. 1A-1B illustrate a typical system and interference scenario of the present invention. FIG. 1A depicts a typical system of the present invention. One or more satellites 100 transmit signals 104, 106 to receivers 108, 110 in different geographical regions. The signals 104, 106 may have similar carrier frequencies and carry different information. Because the signals 104, 106 employ very similar carrier frequencies there is a potential for them to interfere. Interference is principally minimized through a geographic separation of the receivers 108, 110, i.e. through spatial diversity. Similarly, the signals may be separated based on the direction to the transmitter (not shown in FIG. 1A). In other words, a dish antenna may be focused in the direction of one transmitting satellite in favor of another. Furthermore the transmission system may employ spotbeam antennas to further isolate the signals 104, 106 from one another and minimize interference. For any given receiver, particularly in areas near the edges of adjacent signal coverage regions, a desired signal 106 may be impinged by an interfering signal 104B. (The signal 104A, associated with the interfering signal 104B, is intended for the receiver 108.) The present invention employs comparison signal processing 114 as an adjunct to the regular signal processing 112 of the receiver 110 to accurately measure the power levels of different components of the received signal.

The invention may operate as integral component of integrated receiver/decoder (IRD) of a direct satellite broadcast system or in a dedicated receiver. Furthermore, the invention is consistent with communication systems that are designed to operate with layered modulation. Signal comparison processing is fundamental to such systems and thus any benefits derived from the present invention may be made available to such systems for optimal system performance. These processes will be detailed in the discussion of FIGS. 2A-2B hereafter.

FIG. 1B depicts the power profiles in a typical interference scenario. Although the peak effective isotropic radiated power (EIRP) of an interfering beam 104 may be higher than chat of the desired beam 106, the CIR and CNR at a given location of interest 116 (e.g. the location of the antenna for receiver 110) must be sufficiently high for a receiver to work. The received signal at any location within the service footprint includes the desired signal 106, an interfering signal 104 and noise 118. In one embodiment, the primary signal comprises a legacy signal having legacy data transmitted to a plurality of legacy receivers, the interference signal comprises a non-legacy signal having non-legacy data adding to or enhancing the legacy data transmitted to a plurality of non-legacy receivers, and the legacy signal is non-coherently layered with the non-legacy signal. The received power is the sum of the carrier power 120 at the location of interest 116 (i.e. from the carrier signal 106), the interference power 122 at the location of interest 116 (i.e. from the interfering signal 104B) and the noise 118.

The invention is a precision method to calculate the relative power levels among signal, interference and noise. For simplicity, only one interference source is assumed in the following discussion. The principle is applicable and the processing technique is extendable for multiple interference sources of known modulation and FEC coding types. The locations of particular interest are wherever a strong interference source is present. This requires that an adequate power separation (such as 5 dB for QPSK, for example, depending on forward error correction (FEC) coding strength) among signal and interference sources exists for the invention method to work, which allows successive demodulation and decoding of the primary and interference signals. Each additional interfering signal is demodulated and decoded after subtracting all reconstructed higher power signals (as measured at the location of interest).

Measurements made in the field (at each receiver) using the present invention may be used in satellite power control systems, part of a central control system 124, to achieve optimal carrier power vs. interference performance over a coverage area. The measurements may be fed back into the central control system 124 through a number of different mechanisms. For example, the measurements may be appended to regular communications between the IRD and a central system or the measuring IRD may transmit the power measurements back to the central system through a different means.

Figure 2A:
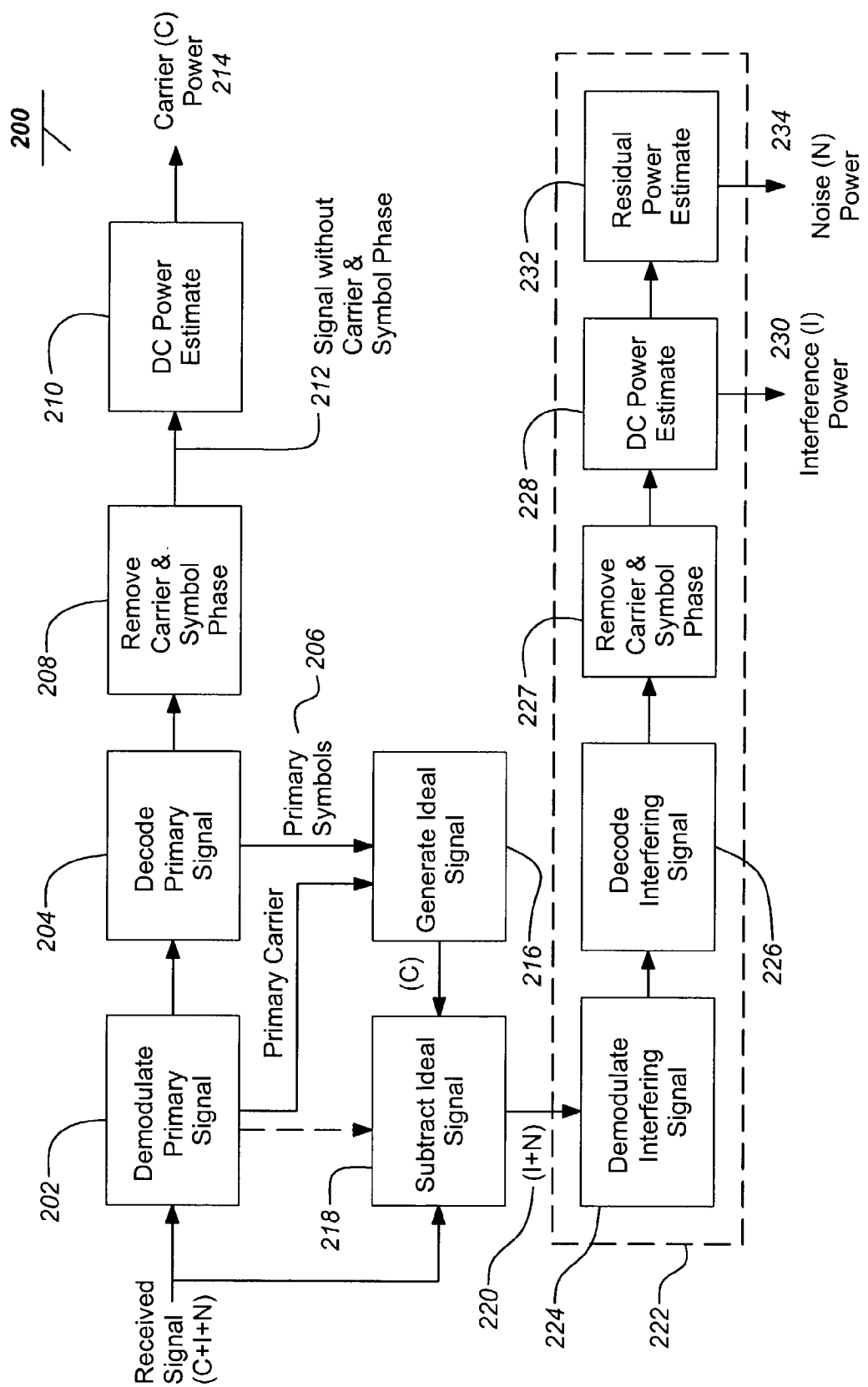
FIGS. 2A-2B are signal processing block diagrams of an apparatus and method of the invention.
Figure 2B:
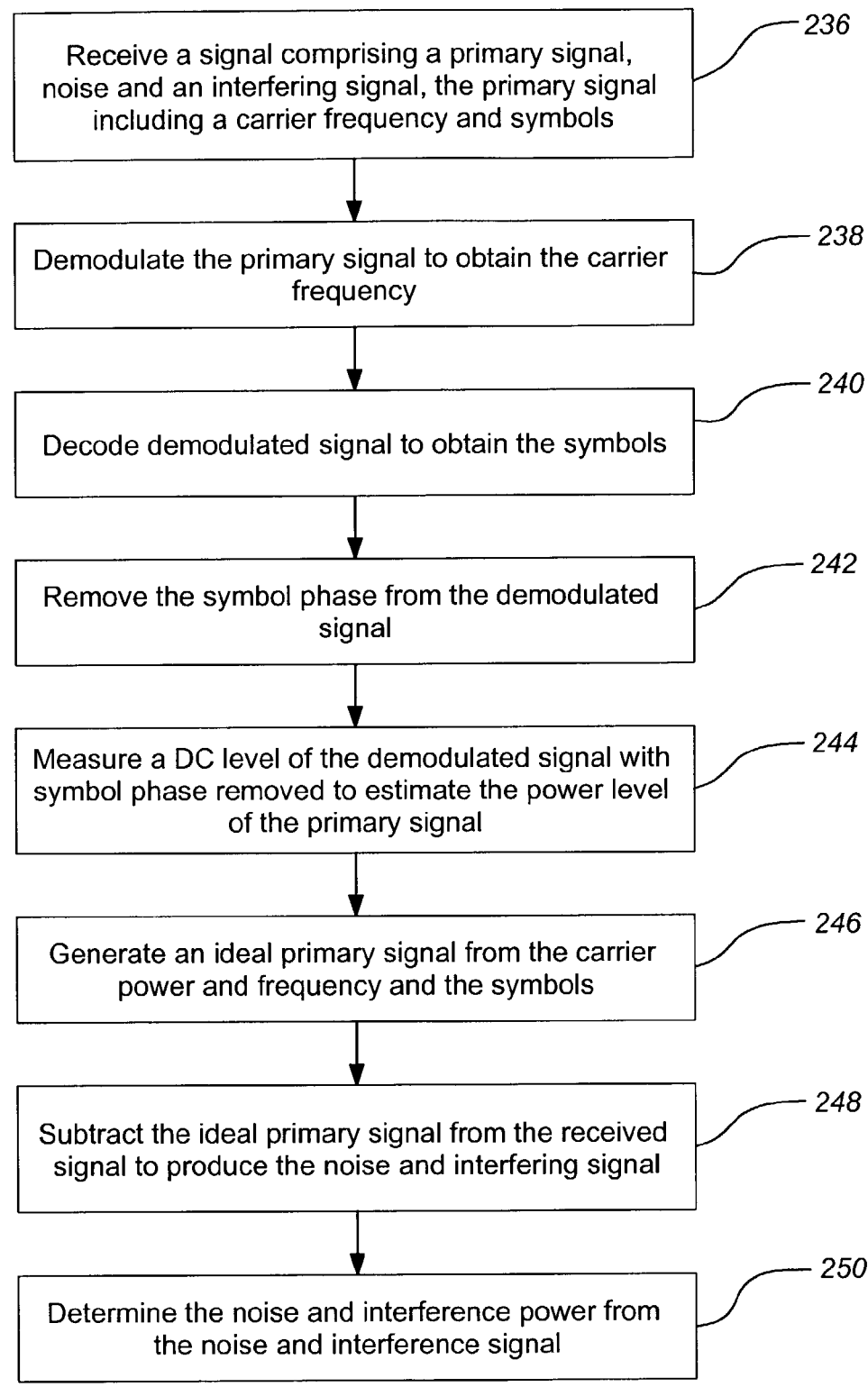

FIGS. 2A-2B are signal processing block diagrams of an apparatus and method of typical embodiments of the present invention. FIG. 2A is a block diagram of the apparatus. A demodulator 202 receives the signal which includes the primary signal, interference and noise and demodulates it to obtain the primary signal carrier. Next, the decoder 204 receives the demodulated signal and decodes it to produce the primary signal symbols 206. A processor 208 also removes the carrier and symbol phase from the decoded signal. A measurement processor 210 measures the DC power of the signal without the carrier and symbol phase 212 as the estimated carrier power 214. In order to isolate the interference signal for analysis, the primary carrier and symbols 206 derived from the demodulation 202 and decoding 204 are used in a signal generator 216 to generate an ideal original carrier signal. The ideal signal is free of interference and noise, but is remodulated with the carrier phase. The ideal signal is then subtracted from the received signal by a subtractor 218. In alternate embodiments, the ideal signal can be generated without the remodulated carrier phase and subtracted from the demodulated signal rather than from the received signal. The subtraction leaves the interference plus noise 220. The interference plus noise 220 result can then be evaluated in a number of different ways by an interference and noise processor 222.

In one embodiment, the interference and noise processor 222 is a single estimator which makes a power measurement of the aggregate interference plus noise 220. This embodiment does not distinguish between the contribution of the interfering signal and that of the noise. For broadcast systems which are only concerned with power control for non-interfering beams, a single measurement is all that is obtainable (i.e. there is no interfering signal). In an alternate embodiment, the interference and noise processor 222 is a subsystem which obtains discrete estimates of the interference and noise power levels. For separate interference and noise power measurement, the process of demodulation and decoding is repeated for this (I+N) signal in a second demodulator 224 and second decoder 226. As before, a carrier and decoded symbol phase are removed from the signal 227. In this case, it is the interference carrier and symbol phase of the interfering signal that are removed. A estimator 228 measures the DC component of the resulting signal as the interference power level 230. Finally, noise power level 234 is estimated by subtracting the estimated interference power from the total interference and noise power in a processor 232.

FIG. 2B is block diagram of the basic method of the present invention. The basic method of measuring signal properties comprises receiving a signal comprising a primary signal, noise and an interfering signal at block 236. The primary signal includes a carrier frequency and symbols. At block 238, the primary signal is demodulated to remove the carrier frequency. At block 240, the demodulated signal is decoded to obtain the symbols. At block 242, the symbol phase is removed from the demodulated signal. A DC level of the demodulated signal with symbol phase removed is measured to estimate the power level of the primary signal at block 244. At block 246, an ideal primary signal is generated from the carrier power and frequency and the symbols. Then the ideal primary signal is subtracted from the received signal to produce the noise and interfering signal at block 248. Finally, the noise and interference power are determined from the noise and interference signal 250. The noise and interference power may be determined as a combined value or separately as previously described.

A mathematical derivation of the power measurement method is provided as follows. Assuming, a phase-shift keying signal without loss of generality, the receive signal may be presented as:

$$s(t) = \sum_{n=1}^{N} A p(t - n\Delta t) \exp\{j\theta(n)\} + n_0(t) \quad (1)$$

where A is the amplitude of the signal, p(t) represents the pulse shaping filter, $\Delta t$ is the symbol interval, $\theta(n)$ is the phase of the n-th symbol, $n_0(t)$ is the additive noise and N is the number of symbols within the observation interval. Assuming perfect timing of the baud-rate A/D samples at the matched-filter output, $$s(n) = A \exp\{j\theta(n)\} + n_0(n) \quad (2)$$

$$s^*(n) = A \exp\{-j\theta(n)\} + n_0^*(n) \quad (3)$$

where * denotes the conjugate of a complex number. Integrating the powers across all symbols obtains the following.

$$\sum_{n=1}^{N} s(n) s^*(n) = NA^2 + \sum_{n=1}^{N} n_0(n) n_0^*(n) + \Delta = N(A^2 + N_0) + \Delta \quad (4)$$

where $N_0 = E\{n_0(n) n_0^*(n)\}$ is the power of a noise sample and $$\Delta = 2A \sum_{n=1}^{N} \text{real}(\exp\{j\theta(n)\} n_0^*(n)) \quad (5)$$

is a zero-mean random variable. Thus equation (4) provides an estimate of the total power, $A^2 + N_0$. When carrier and symbol phases are removed first, $$s(n) = A + n_0(n) \quad (6)$$

$$s^*(n) = A + n_0^*(n) \quad (7)$$

the integrated power from all symbols is given as follows.

$$\left(\sum_{m=1}^{N} s(m)\right)\left(\sum_{n=1}^{N} s(n)\right)^* = \sum_{m=1}^{N} \sum_{n=1}^{N} s(m) s^*(n) \quad (8)$$

$$= N^2 A^2 + \sum_{n=1}^{N} n_0(n) n_0^*(n) + \Delta \quad (9)$$

$$= N^2 \left(A^2 + \frac{N_0}{N}\right) + \Delta' \quad (10)$$

where $$\Delta' = 2NA \sum_{n=1}^{N} \text{real}(n_0(n)) \quad (11)$$

and $\Delta'$ is also a zero-mean random variable.

Equation (10) provides an estimate of the carrier power $A^2$, as it includes little noise power $$\frac{N_0}{N}$$

for a large number of samples, N. Alternately, equations (4) and (10) maybe be combined to solve for the two unknowns, $A^2$ and $N_0$ for a given N.

Figure 3:
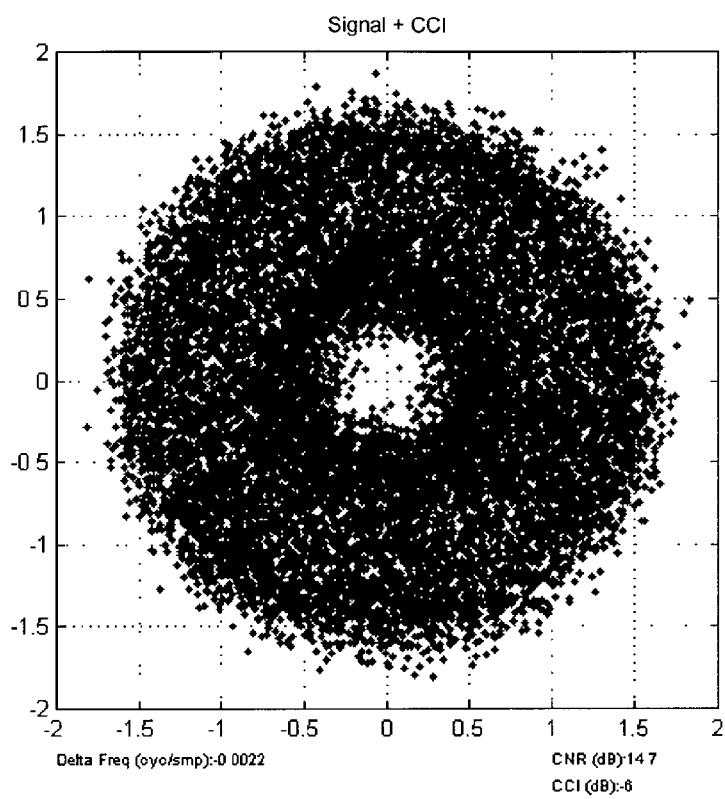
FIG. 3 is a plot of a received signal.

FIGS. 3-10 show example intermediate results at various stages of the power measurement process. FIG. 3 depicts an example received signal including the primary (desired signal), the interfering signal and noise. The power of the primary signal is at 0 dB, the interference is at −6 dB and the noise is at −14.7 dB, yielding an effective CNR of 5.5 dB and an INR of 8.7 dB. The carrier frequency rotates the constellation around the origin. The effective CNR determines the thickness of the ring shape.

Figure 4:
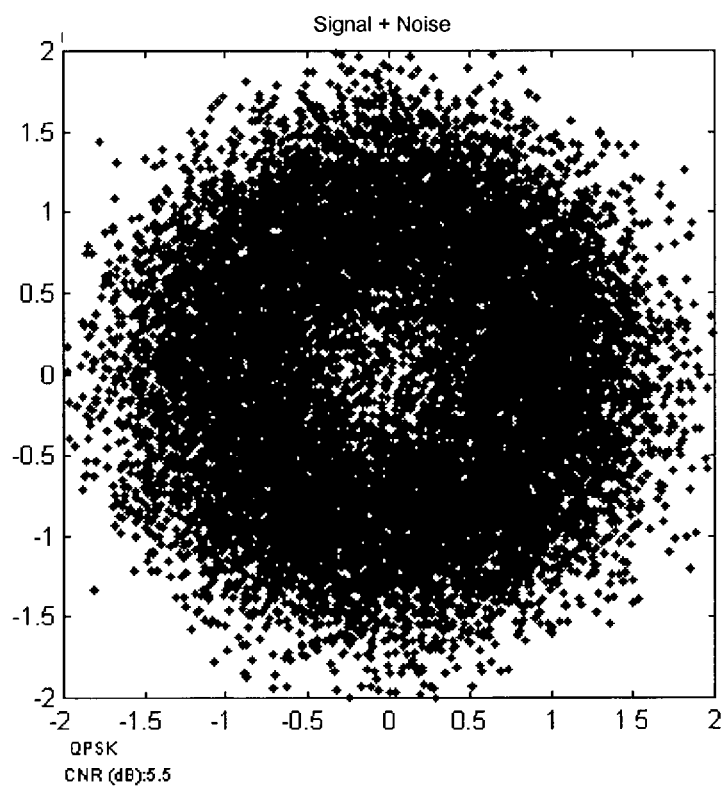
FIG. 4 is plot of a signal without interference.

For comparison, FIG. 4 is plot of a signal without interference. In this case the noise is at −5.5 dB with the signal at 0 dB, yielding a CNR of 5.5 dB. Although the CNR is identical to that of FIG. 3, it is of interest to note that the distribution plot appears noisier.

Figure 5:
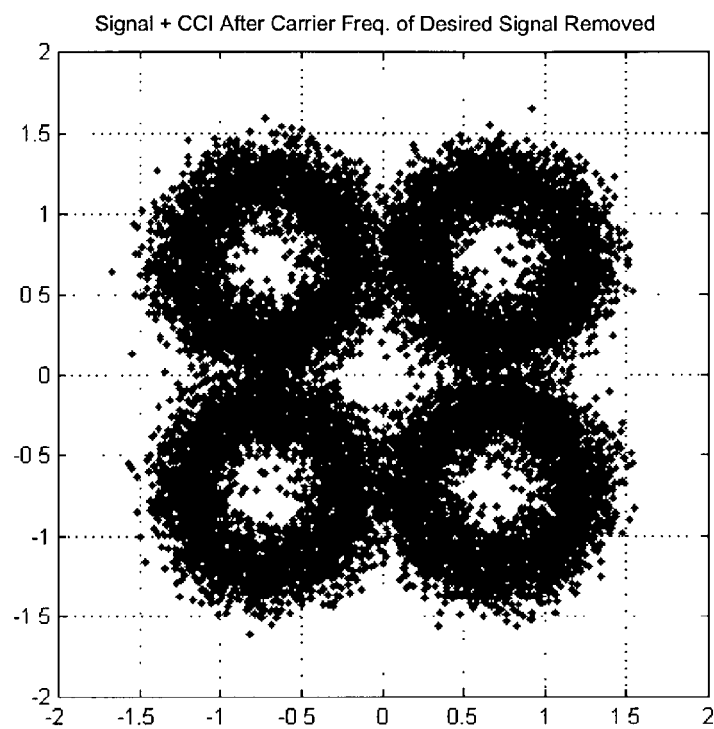
FIG. 5 is a plot of a signal after the carrier frequency is removed.

FIG. 5 is a the plot of the signal after the carrier frequency is removed from FIG. 3 through demodulation. The QPSK constellation is revealed by the four distinct rings. The interference frequency effectively rotates the four smaller constellations about their individual origins. In this case the INR determines the thickness of the individual rings.

Figure 6:
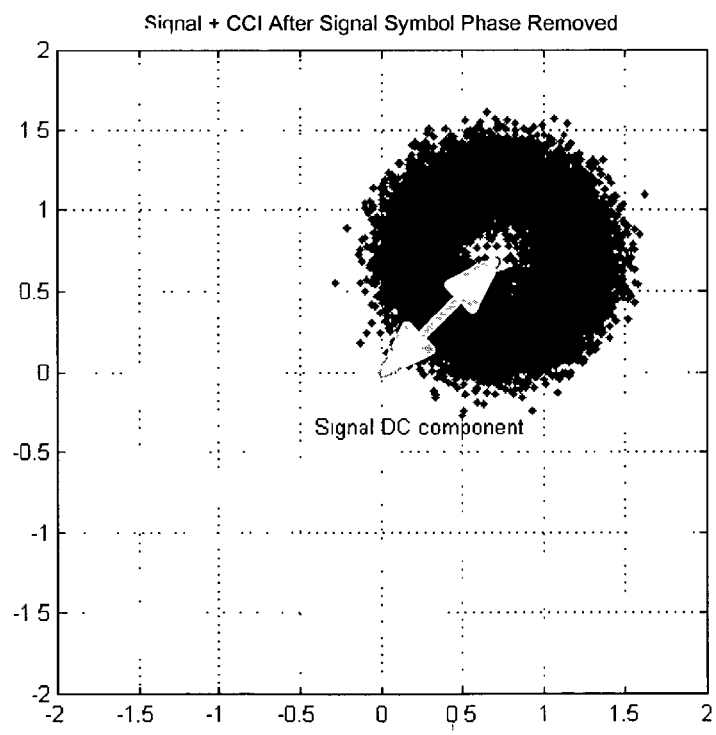
FIG. 6 is a plot of a signal after the symbol phase is removed.

FIG. 6 is a plot of the received signal after the signal symbol phase is removed from FIG. 5 through decoding. The individual rings of FIG. 5 are now combined in a single quadrant. The DC signal component, representing the power level of the primary signal is depicted as the distance from the center of the ring to the origin. Again, the interference frequency rotates the constellation about the center of the ring and the INR determines the thickness of the ring.

Figure 7:
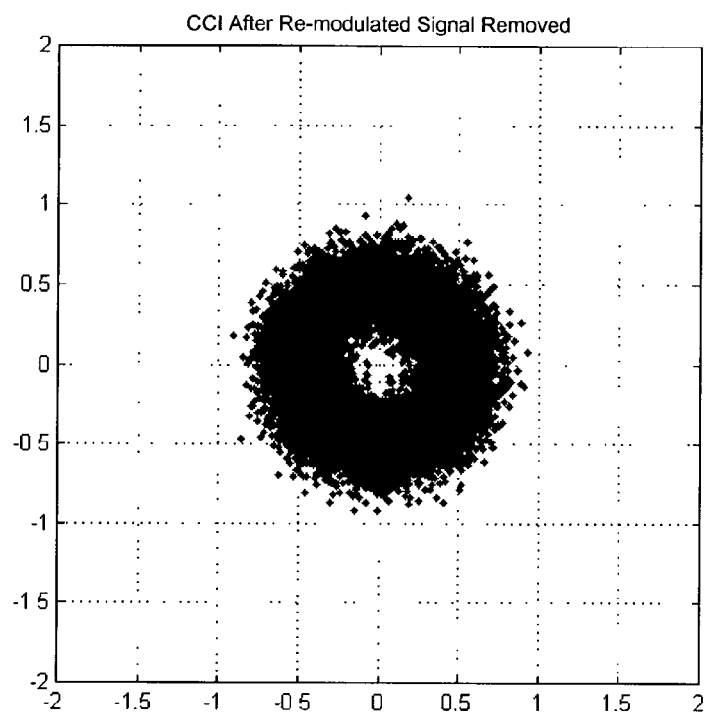
FIG. 7 is a plot of the interference and noise of a signal.

FIG. 7 is a plot of the interference and noise of the signal after the ideal primary signal has been subtracted from FIG. 6. The combined power may be measured directly from this plot without further processing, as represented by the mean-squared radius of the ring. (FIG. 7 is the same as FIG. 6, translated to the origin.) In this case, the interference frequency effectively rotates the constellation about the origin. The INR is related to the thickness of the ring. The effective CNR of FIG. 3 and the INR of FIG. 7 are analogous properties.

Figure 8:
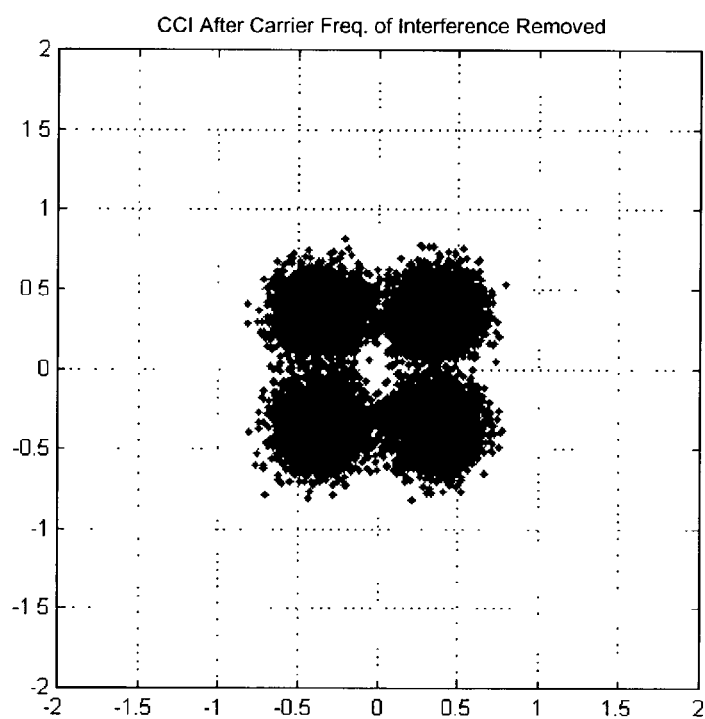
FIG. 8 is a plot of the interference and noise of a signal after the interference carrier frequency is removed.

FIG. 8 is a plot of the interference plus noise of the signal after the interference carrier frequency is removed from FIG. 7 through demodulating. Analogous to removing the carrier of the primary signal in FIG. 5, the QPSK constellation of the interference signal is now visible. As the interference power is indicated by the distance of the node centers to the origin and the noise is indicated by the thickness of the nodes, the INR determines the tightness of the nodes.

Figure 9:
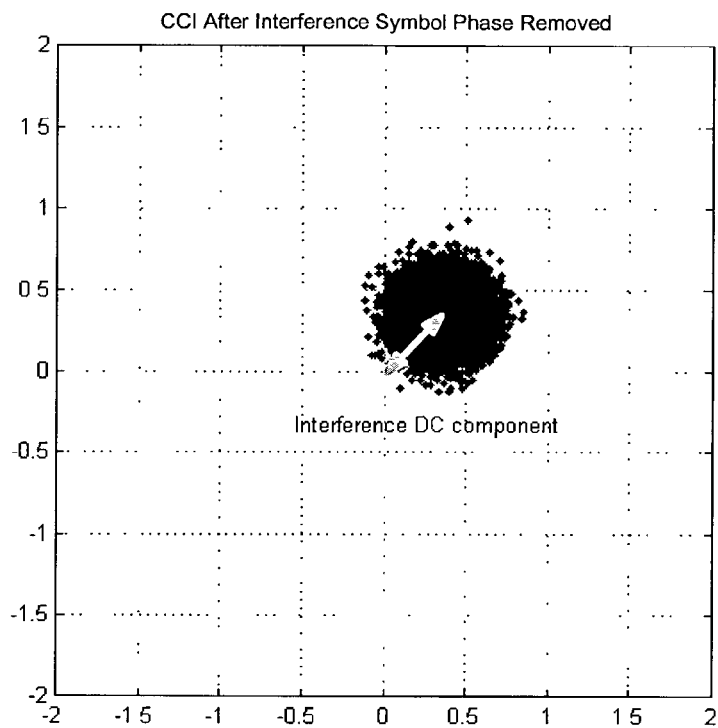
FIG. 9 is a plot of the interference and noise of a signal after the interference symbol phase is removed.

FIG. 9 is a plot of the interference plus noise after the interference symbol phase is removed from FIG. 8 through decoding. The DC signal component, representing the power level of the interference signal, is the distance from the center of the circle to the origin. Here, the INR determines the size of the node circle.

Figure 10:
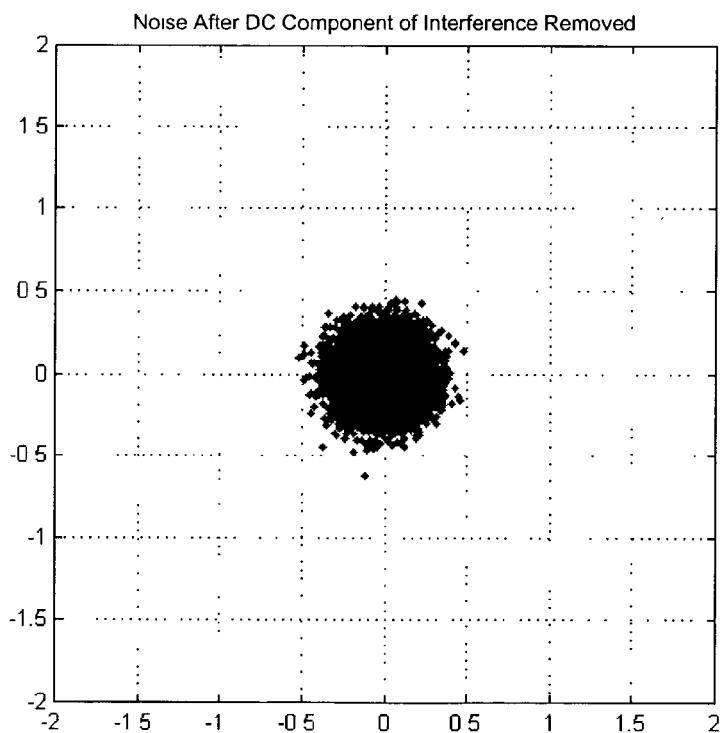
FIG. 10 is a plot of the noise of a signal.

FIG. 10 is a plot of the noise after the interference signal is removed from FIG. 9. The noise power level is measured directly from this signal, as represented by the mean-squared radius of the circle.

CONCLUSION

The foregoing description including the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. A method of measuring signal properties, comprising the steps of:
    receiving a signal comprising a primary signal, an interference signal and noise, the primary signal including a carrier frequency and symbols;
    demodulating the primary signal to remove the carrier frequency;
    decoding the primary signal to obtain the symbols;
    estimating a power level of the primary signal based upon the demodulated and decoded primary signal;
    generating an ideal primary signal from the carrier frequency and the symbols;
    subtracting the ideal primary signal from the received signal to produce the noise and interference signal; and
    estimating the noise and interference power from the noise and interference signal.

2. The method of claim 1, further comprising removing a symbol phase from the demodulated primary signal and wherein the step of estimating a power level of the primary signal comprises measuring a DC level of the demodulated primary signal with the symbol phase removed.

3. The method of claim 1, wherein estimating the noise and interference power comprises estimating a combined noise and interference power.

4. The method of claim 1, wherein the interference signal includes an interference carrier and interference symbols and estimating the noise and interference power comprises demodulating and decoding the interference signal to remove the interference carrier and interference symbols and produce a signal having an interference signal DC level and a noise level.

5. The method of claim 4, further comprising estimating the interference power from the interference signal DC level.

6. The method of claim 5, further comprising estimating the noise power by subtracting the interference DC level from the signal having an interference signal DC level and noise level.

7. The method of claim 1, wherein the received signal further includes at least one additional interference signal and each additional interference signal is demodulated and decoded to remove a carrier and symbols of the respective additional interference signal after subtracting all higher power signals.

8. The method of claim 7, wherein a power level of each additional interference signal is calculated from a DC level of the respective additional interference signal.

9. The method of claim 1, wherein the method is performed integral to a receiver.

10. The method of claim 9, wherein the receiver is an integrated receiver decoder (IRD) or a dedicated receiver.

11. The method of claim 9, wherein the primary signal power and the noise and interference power are communicated to a power control system to optimize primary and interference signal power over a coverage area.

12. The method of claim 9, wherein the primary signal power and the noise and interference power are communicated to a central system through a phone dialup.

13. An apparatus for measuring signal properties, comprising:
    a demodulator, for receiving a signal including a primary signal, an interference signal and noise, for demodulating the primary signal to remove a carrier frequency from the primary signal;
    a decoder for decoding the primary signal to obtain symbols from the primary signal;
    a processor for estimating a power of the primary signal from the demodulated and decoded primary signal;
    a signal generator for generating an ideal primary signal from the carrier frequency and the symbols;
    a subtractor for subtracting the ideal primary signal from the received signal to yield the noise and interference signal; and
    a processor for determining the noise and interference power from the noise and interference signal.

14. The apparatus of claim 13, further comprising a processor for removing a symbol phase from the demodulated primary signal and wherein the step of estimating a power level of the primary signal comprises measuring a DC level of the demodulated primary signal with the symbol phase removed.

15. The apparatus of claim 13, wherein the processor for determining the noise and interference power determines the noise and interference power by calculating a combined noise and interference power.

16. The apparatus of claim 13, wherein the interference signal includes an interference carrier and interference symbols and the processor for determining the noise and interference power comprises a second demodulator and decoder for determining the noise and interference power by demodulating and decoding the interference signal to remove the interference carrier and interference symbols and produce a signal having an interference signal DC level and a noise level.

17. The apparatus of claim 16, wherein the processor for determining the noise and interference power further comprises a processor for calculating the interference power from the interference signal DC level.

18. The apparatus of claim 17, wherein the processor for determining the noise and interference power further comprises a subtractor for subtracting the interference DC level from the signal having an interference signal DC level and a noise level to calculate the noise power.

19. The apparatus of claim 13, wherein the received signal further includes at least one additional interference signal and each additional interference signal is demodulated and decoded to remove a carrier and symbols of the respective additional interference signal after subtracting all higher power signals.

20. The apparatus of claim 19, wherein a power level of each additional interference signal is calculated from a DC level of the respective additional interference signal.

21. The apparatus of claim 13, wherein the apparatus is integral to a receiver.

22. The apparatus of claim 21 wherein the receiver is an integrated receiver decoder (IRD) or a dedicated receiver.

23. The apparatus of claim 21, wherein the primary signal power and the noise and interference power are communicated to a central system to optimize primary and interference signal power over a coverage area.

24. The apparatus of claim 21, wherein the primary signal power and the noise and interference power are communicated to a central system through a phone dialup.

25. The method of claim 4, wherein:
the primary signal comprises a legacy signal having legacy data transmitted to a plurality of legacy receivers,
the interference signal comprises a non-legacy signal having non-legacy data adding to or enhancing the legacy data transmitted to a plurality of non-legacy receivers; and
the legacy signal is non-coherently layered with the non-legacy signal.

26. The apparatus of claim 16, wherein:
the primary signal comprises a legacy signal having legacy data transmitted to a plurality of legacy receivers,
the interference signal comprises a non-legacy signal having non-legacy data adding to or enhancing the legacy data transmitted to a plurality of non-legacy receivers; and
the legacy signal is non-coherently layered with the non-legacy signal.

* * * * *